(12) United States Patent
Romain et al.

(10) Patent No.: US 8,195,946 B2
(45) Date of Patent: Jun. 5, 2012

(54) PROTECTION OF DATA OF A MEMORY ASSOCIATED WITH A MICROPROCESSOR

(75) Inventors: Fabrice Romain, Aix en Provence (FR); Alain Pomet, Rousset (FR)

(73) Assignee: STMicroelectronics S.A., Montrouge (FR)

( * ) Notice: Subject to any disclaimer, the term of this patent is extended or adjusted under 35 U.S.C. 154(b) by 939 days.

(21) Appl. No.: 11/402,307

(22) Filed: Apr. 11, 2006
(Under 37 CFR 1.47)

(65) Prior Publication Data
US 2007/0174622 A1     Jul. 26, 2007

(30) Foreign Application Priority Data

Apr. 11, 2005   (FR) ..................................... 05 50923

(51) Int. Cl.
*H04L 9/32* (2006.01)
*G06F 11/30* (2006.01)
(52) U.S. Cl. ........ 713/176; 713/180; 711/163; 711/164; 714/732; 714/726
(58) Field of Classification Search .................. 713/193, 713/176, 180; 714/732; 380/264
See application file for complete search history.

(56) References Cited

U.S. PATENT DOCUMENTS

| | | | | |
|---|---|---|---|---|
| 4,864,615 A | * | 9/1989 | Bennett et al. | 380/239 |
| 4,876,684 A | * | 10/1989 | Guntheroth | 714/719 |
| 4,991,175 A | * | 2/1991 | Easingwood-Wilson | 714/732 |
| 5,280,451 A | * | 1/1994 | Akaogi | 365/185.04 |
| 6,247,151 B1 | | 6/2001 | Poisner | |
| 2002/0055942 A1 | * | 5/2002 | Reynolds | 707/200 |
| 2004/0148536 A1 | * | 7/2004 | Zimmer et al. | 713/323 |
| 2004/0221132 A1 | * | 11/2004 | Torkelsson et al. | 711/210 |
| 2006/0047884 A1 | * | 3/2006 | Tran et al. | 711/3 |
| 2006/0064593 A1 | * | 3/2006 | Dobranski | 713/176 |

OTHER PUBLICATIONS

French Search Report from French Patent Application 05/50923, filed Apr. 11, 2005.
Hagai Bar-El et al., "The Sorcerer's Apprentice Guide to Fault Attacks" Workshop on Fault Detection and Tolerance in Cryptography, 'Online! May 7, 2004 XP002329915.
Moore et al., "Balanced self-checking asynchronous logic for smart card applications" Microprocessors and Microsystems, IPC Business Press Ltd. London, GB, vol. 27, No. 9, Oct. 2003, pp. 421-430, XP004453315.
Jacob Savir: "Random Pattern Testability of Memory Address Logic" IEEE Transactions on Computer-Aided Design of Integrated Circuits and Systems, 'Online! vol. 17, No. 12, Dec. 1998, pp. 1310-1318, XP002344968.

* cited by examiner

*Primary Examiner* — Taghi Arani
*Assistant Examiner* — Mohammad Rahman
(74) *Attorney, Agent, or Firm* — Wolf, Greenfield & Sacks, P.C.

(57) ABSTRACT

A method and a circuit for checking the coherence between data read from a first area of a memory of a microcontroller and the address of these data, including calculating a current digital signature of the read data by a function also taking into account the address of these data in the memory, and checking the coherence between the current signature and a previously-recorded signature.

18 Claims, 2 Drawing Sheets

PROTECTION OF DATA OF A MEMORY ASSOCIATED WITH A MICROPROCESSOR

BACKGROUND OF THE INVENTION

1. Field of the Invention

The present invention generally relates to electronic circuits and, more specifically, to the protection of data contained in a memory associated with a microprocessor against an extraction thereof, especially after fault injections into the electronic circuit operation. The present invention more specifically relates to microcontrollers integrating both a microprocessor and data storage elements.

2. Discussion of the Related Art

FIG. 1 partially and schematically illustrates an example of a simplified architecture of an integrated circuit 1, for example a microcontroller, of the type to which the present invention applies. Circuit 1 comprises a central processing unit 11 (CPU) associated with a program memory 12 (ROM) generally of read-only memory type, with one or several data memories 13 (MEM), and with an input/output circuit 14 (I/O) enabling data exchange with the outside of the circuit. The different elements communicate over one or several data, address, and control buses 15. Memory or memories 13 may be of any type (rewritable or not RAM, non-volatile memory, etc.) or a combination of several types of memories.

Among possible attacks performed by persons attempting to extract confidential data (for example, a secret code) contained in memory 13, the present invention applies to so-called differential fault analysis attacks (DFA) which comprises the disturbing of the operation of microcontroller 1 by means of a radiation (laser, infrared, X-rays, etc.) or by other means (for example, by acting on the component power supply).

Some integrated circuits comprise software tools for detecting such disturbances by checking the correct execution of programs. For example, the same instructions are executed twice and it is checked whether they lead to the same result, or a signature calculation is performed on data extracted from memory 13.

A category of particularly efficient disturbances comprises the directional disturbing (orientation of a radiation, for example) of the peripheral circuits (address decoder, for example) of memory 13 during an order for reading from an authorized area of this memory. "Authorized area" is used to designate an area, in which the data that it contains are allowed to come out of microcontroller 1, conversely to those of protected areas containing confidential data that must remain in this circuit. Disturbing, for example, the address decoder (assumed to be contained in block 13) of the memory enables jumping from an authorized memory area to a protected area. Since the executed order then is an order to read from the authorized memory, the hacker is likely to recover the critical data without the access control mechanisms detecting this access violation. For example, in case of a control of the address present on bus 15 by the central processing unit, said address is correct since the disturbance only intervenes in the peripheral area of memory 13. Software protection systems are most often ineffective against this type of fraud.

Another disadvantage of "software" solutions is that they take execution time from the capacity of the central processing unit.

A problem is to be able to detect such a disturbance. Once the disturbance has been detected, many solutions exist according to the applications, either to block the component, or to forbid the outputting of critical data, etc.

Another known fraud technique comprises disturbing the read amplifiers of memories (especially of ROMs), to modify the read value and thus modify the flow of the program having generated this reading. It is then possible, for example, to modify the comparison result to provide access to an unlimited number of trials of the pin code of a smart card.

SUMMARY OF THE INVENTION

The present invention aims at overcoming all or part of the disadvantages of known systems for protecting a microcontroller against possible frauds by fault injection into the circuit operation.

The present invention more specifically aims at providing a solution which enables detecting a disturbance of the address decoder of a circuit.

The present invention also aims at not adversely affecting the operation of the central processing unit of the microcontroller.

To achieve all or part of these objects, as well as others, the present invention provides a method for checking the coherence between data read from a first area of a memory of a microcontroller and the address of these data, comprising:

calculating a current digital signature of the read data by means of a function also taking into account the address of these data in the memory; and checking the coherence between the current signature and a previously-recorded signature.

According to an embodiment of the present invention, the recorded signature is stored in said first area of the memory at the same address as the data.

According to an embodiment of the present invention, the recorded signature is stored in a second area of the memory.

According to an embodiment of the present invention, said recorded signature is extracted from said second area of the memory in periods when no reading is required from the first area.

According to an embodiment of the present invention, at least four groups of temporary storage registers are used to respectively store at least the data, their addresses, the signatures extracted from the memory, and the current calculated signatures.

According to an embodiment of the present invention, a fifth group of registers stores the addresses of the signatures recorded in the memory.

According to an embodiment of the present invention, the groups of registers are of shift type.

According to an embodiment of the present invention, the method is implemented by a central processing unit of the microcontroller.

According to an embodiment of the present invention, the method is implemented by a circuit different from a central processing unit of the microcontroller.

According to an embodiment of the present invention, a possible saturation of the number of accesses stored in the registers is detected.

The present invention also provides a circuit for checking a digital signature of data read from a memory for detecting a possible fraud attempt, comprising elements of temporary storage at least of addresses, of data, of current signatures which are a function of the addresses and data, and of signatures recorded in the memory for several successive data, and calculation and comparison elements.

According to an embodiment of the present invention, one of the temporary storage elements stores the addresses of the signatures recorded in the memory.

The present invention also provides a smart card comprising a checking circuit.

The foregoing and other objects, features, and advantages of the present invention will be discussed in detail in the following non-limiting description of specific embodiments in connection with the accompanying drawings.

DETAILED DESCRIPTION

Figure 1:
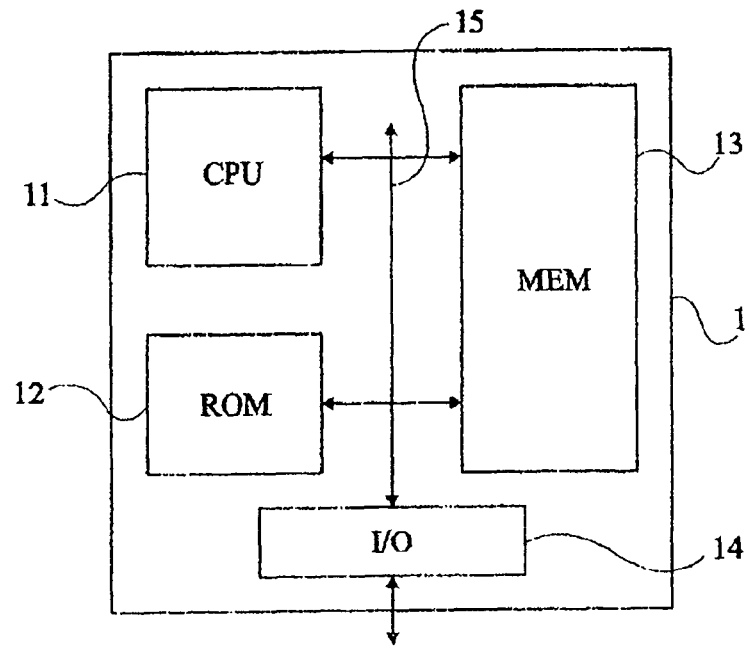
FIG. 1, previously described, schematically illustrates an example of a simplified architecture of an integrated circuit of the type to which the present invention applies.

The same elements have been designated with the same reference numerals in the different drawings. For clarity, only those elements which are useful to the understanding of the present invention have been shown in the drawings and will be described hereafter. In particular, the exploitation that is made of the possible fraud detection has not been described in detail, since the present invention is compatible with the exploitations conventionally made in case of a fraud attempt detection. Further, reference will be made to term "data" to designate any digital information, be it actual data or a program instruction, etc. Further, only the reading of the data from the memory will be described, since the present invention does not modify the operation in write mode of these data.

Figure 2:
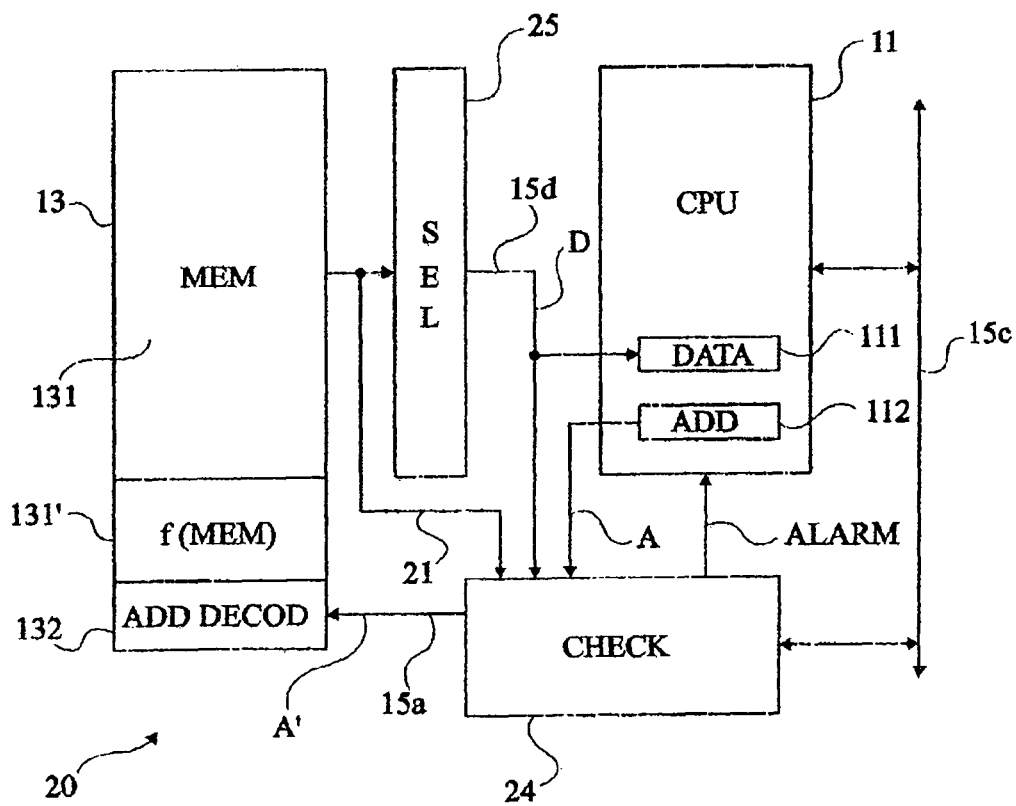
FIG. 2 partially and schematically illustrates an embodiment of a circuit for detecting fraud attempts according to the present invention.

FIG. 2 partially and schematically illustrates an embodiment of an integrated circuit forming a microcontroller 20 according to the present invention. Circuit 20 is, for example, contained in a smart card.

As previously, an integrated circuit of the type to which the present invention applies comprises a central processing unit 11 (CPU), one or several memories 13 (here symbolized by a memory plane 131 (MEM) and its address decoder 132 (ADD DECOD)). Circuit 20 also comprises a program memory (12, FIG. 1). Said memory has not been illustrated in FIG. 2 since the present invention also protects against a fraud attempt by disturbance of the program operation to extract confidential information therefrom (for example, a native key, written on manufacturing of the circuit). The present invention will thus be discussed in relation with the example of a memory 13, but it applies to any memory associated with a microprocessor or integrated with a microprocessor (central processing unit) in a circuit 20 which is desired to be protected. Unit 11 comprises (or is associated with), conventionally, a data register 111 (DATA) and an address register 112 (ADD) for temporarily storing and controlling the memory operation. In FIG. 2, buses 15 have been shown as a control bus 15c, an address bus 15a, and a data bus 15d. Of course, such buses comprise signals intended for other circuits of the controller which have not been illustrated in FIG. 2.

According to the embodiment of FIG. 2, microcontroller 20 comprises a circuit 24 (CHECK) for checking the coherence of the data read from memory 13. This circuit is a signature calculation circuit (calculation of a bit or of a digital word corresponding to the application of an algorithm at least to the data read from the memory). Preferably, circuit 24 is autonomous. As a variation, it is controlled by unit 11 and then receives therefrom signals from bus 15c. Circuit 24 receives the data read from memory 13 by bus 15d.

According to this first embodiment of the present invention, memory plane 131 also comprises an area 131' (f(MEM)) for storing signatures associated with the data contained in all or part (for example, only areas containing data considered as critical from a confidentiality viewpoint) of memory plane 131. A selection circuit 25 (SEL) is used, in this example, to transfer to central processing unit 11, more specifically to its register 111, data D read from memory plane 131 while these data are also directed towards circuit 24 and signatures originating from area 131' of the memory plane are provided to circuit 24 directly over a connection 21 upstream of selector 25. In practice, circuit 25 is formed of an assembly of three-state amplifiers forming a buffer at the output of memory 13.

Circuit 24 provides an interrupt signal (ALARM) to central processing unit 11 in the case of a fraud attempt detection. Further, it provides address A' for reading data from the memory plane over address bus 15a and receives addresses A originating from register 112 of the central processing unit. Functionally, circuit 24 is, from the addressing viewpoint, interposed between the central processing unit (register 112) and memory 13.

According to a preferred embodiment of the present invention, circuit 24 comprises temporary memory elements to use the idle times of central processing unit 11 in terms of memory addressing to perform signature calculations. In other words, the checking of the coherence of the data read from the memory against its signature is performed while the central processing unit is available. In particular, the extraction of the signatures stored in area 131' is performed during cycles when unit 11 needs not access to memory 13.

Figure 3:
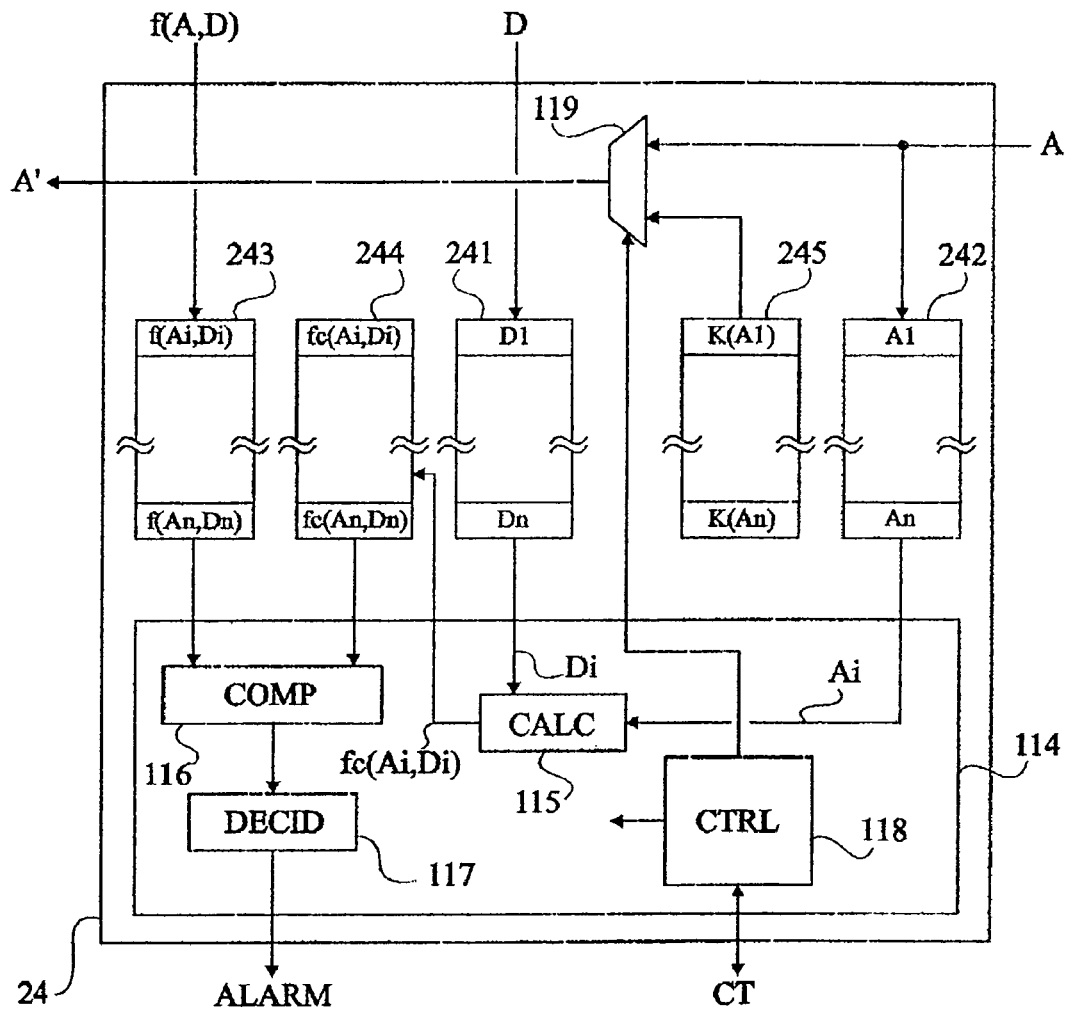
FIG. 3 shows a more detailed embodiment of the checking circuit of FIG. 2.

FIG. 3 schematically shows in the form of blocks an example of a circuit 24 according to a preferred embodiment of the present invention.

Preferably, the signature takes into account not only the data, but also its storage address in memory 13. Thus, circuit 24 receives address A provided by register 112 of central processing unit 11, data D originating from bus 15d corresponding to the data sent to central processing unit 11, control signals CT originating from control bus 15c and essentially from central processing unit 11, and signatures f(A, D) which are extracted from area 131' of memory 13 on request and which are a function of address A and of data D. Circuit 24 provides address decoder 132 with an address A' corresponding either to address A required by central processing unit 11, or to the address of a signature for checking. Circuit 24 also provides central processing unit 11 with signal ALARM indicative of a possible fraud attempt detection.

According to this embodiment of the present invention, circuit 24 comprises several groups or stacks of registers (or other temporary storage elements) for temporarily storing information to enable signature calculation during idle times of the central processing unit. In other words, the calculation elements used by circuit 24 (symbolized in FIG. 3 by a block 114) may be dedicated circuits or correspond to circuits of central processing unit 11. They are then preferably used during periods when central processing unit 11 needs not perform other processings for the rest of the circuit.

A first stack 241 of registers contains data D1 to Dn extracted from memory plane 131. A second stack 242 of registers contains the corresponding memory addresses A1 to An. A third stack 243 of registers is intended to contain signatures f(A1, D1) to f(An, Dn) stored in area 131' and which correspond to the data and to the addresses of stacks 241 and 242. A fourth stack 244 of registers contains current signatures fc(A1, D1) to fc(An, Dn) calculated based on data Di (i ranging between 1 and n) of the current address Ai for checking against the prerecorded signatures. Finally, a fifth stack 245 of registers contains addresses K(A1) to K(An) of these signatures.

Calculation block 114 comprises, for example and at least functionally, an element 115 (CALC) for calculating a current signature fc(Ai, Di) based on address Ai and data Di. The result of element 115 is sent to a register of stack 244 at the corresponding position. A comparison element 116 (COMP) compares the signature extracted from memory f(Ai, Di) with the current calculated signature fc(Ai, Di). The result of the comparison is sent to a decision block 117 (DECID) generating, if need be, signal ALARM. A control block 118 (CTRL) receives signals CT from bus 15c and synchronizes the operation of the different elements of block 114. Circuit 118 selects, for addressing the memory (address A'), an address between address A provided by the microcontroller and the signature address K(Ai) provided by stack 245, by means of a multiplexer 119. The signatures are stored at positions different from those of the data in the memory plane.

Preferably, another alarm signal (not shown) is activated in case of a stack overflow, that is, if circuit 114 does not have time to control the signatures due to too large a number of memory accesses required by central processing unit 11.

According to a preferred embodiment, the register stacks all have the same size (n registers) and are of FIFO type.

According to another embodiment, addresses K(Ai) are calculated from addresses Ai, for example, in real time.

An advantage of the present invention is that by using times when the central processing unit does not address the memory to fetch signatures, any time loss with respect to the calculation performed by the main application is avoided.

Another advantage of the present invention is that by taking into account the data storage address in the memory, the system reliability is improved.

According to a first variation, the signature calculation (block 115) is replaced with a second reading of the same address from memory 13 during an unused read cycle, to check the coherence between the two data. This second reading is then checked with the first one to validate it. Indeed, in case of a fraud attempt by fault injection, the two read operations will be different from each other. This amounts to considering that the data signature is the actual data. Preferably, an error-correction code taking into account the address and the data is calculated and stored in the corresponding area of the words in the memory. The possible faults are then also checked in the memory address decoder. This variation however requires "signing" (calculating the error correction code as a function of the address and of the data) for the entire memory and does not enable only "signing" the areas to be protected.

According to another preferred variation, an algorithm such as an error-correction code is used to calculate the result of a function taking into account the address and the data, and the result of the current correction code is compared with a code (signature) stored in area 131' of memory 13. The selection of the ciphering function (error-correction code) depends on the application and on the size of the memory area that can be assigned to the signature storage.

The synchronization of the operation of circuit 24 of the present invention, for both storing the signature results in case of a data change in the memory and performing the checkings functionally described hereabove, is within the abilities of those skilled in the art, the present invention being compatible with any conventional signature calculation.

Of course, the present invention is likely to have various alterations, improvements, and modifications which will readily occur to those skilled in the art. In particular, the practical implementation of the present invention, be it by software and/or hardware means, based on the functional indications given hereabove, is within the abilities of those skilled in the art using conventional tools.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for checking coherence between data read from a first area of a memory of a microcontroller and an address of the read data, comprising:

calculating, by a checking circuit, a current digital signature of the read data by means of a function also taking into account the corresponding address of the read data in the memory, the current digital signature being calculated based on the read data and the address used to access the read data in the first area of the memory, the checking circuit receiving from the microcontroller, for calculating the current digital signature, the address used for addressing the read data in the memory; and checking, by the checking circuit, the coherence between the current digital signature and a previously-recorded digital signature, wherein checking the coherence between the current digital signature and the previously-recorded digital signature, both based on the read data and the address used to access the read data, enables detection of a disturbance to an address decoder associated with the memory, wherein at least four groups of temporary storage registers are used to respectively store at least the data, their addresses, the recorded digital signatures extracted from the memory, and the current calculated digital signatures, and wherein a fifth group of temporary storage registers stores the addresses of the digital signatures recorded in the memory.

2. The method of claim 1, wherein the recorded digital signature is stored in said first area of the memory at the same address as the data.

3. The method of claim 1, wherein the recorded digital signature is stored in a second area of the memory.

4. The method of claim 3, wherein said recorded digital signature is extracted from said second area of the memory in periods when no reading is required from the first area.

5. The method of claim 1, wherein the groups of registers comprise shift registers.

6. The method of claim 1, implemented by a central processing unit of the microcontroller.

7. The method of claim 1, implemented by a circuit different from a central processing unit of the microcontroller.

8. The method of claim 7, wherein a possible saturation of the number of accesses stored in the registers is detected.

9. A circuit for checking a digital signature of data read from a memory for detecting a possible fraud attempt, comprising elements of temporary storage at least of addresses, of data, of current digital signatures which are a function of the addresses of the read data and the read data, and of digital signatures recorded in the memory for several successive data, a calculation element to calculate each of the current digital signatures based on the read data and the address used to access the read data in the memory, the calculation element receiving, for calculating the current digital signatures, the addresses used for addressing the read data in the memory, and a comparison element to check coherence between the current digital signatures and the recorded digital signatures, wherein checking coherence between the current digital signatures and the recorded digital signatures, both based on the read data and the address used to access the read data, enables detection of a disturbance to an address decoder associated with the memory, wherein one of the temporary storage elements stores the addresses of the digital signatures recorded in the memory.

10. A smart card comprising the circuit of claim 9.

11. A method for detecting a fraud attempt on a digital processor, comprising:
   calculating, by a checking circuit, a current digital signature of data read from a memory address area of a memory, the current digital signature being calculated based on the read data and the address used to access the read data in the memory address area, the checking circuit receiving, for calculating the current digital signature, the address used for addressing the read data in the memory address area;
   checking, by the checking circuit, coherence between the current digital signature and a recorded digital signature for the memory address area; and
   providing, by the checking circuit, a fraud attempt indication in response to detecting a lack of coherence between the current digital signature and the recorded digital signature, wherein checking coherence between the current digital signature and the recorded digital signature, both based on the read data and the address used to access the read data, enables detection of a disturbance to an address decoder associated with the memory, further comprising storing the data read from memory, the corresponding address of the data, the current digital signature and the recorded digital signature in respective temporary storage registers and storing the address of the prerecorded digital signature in a temporary storage register.

12. A method as defined in claim 11, wherein the recorded digital signature is stored in the memory.

13. A method as defined in claim 11, wherein the recorded digital signature is stored in the memory with the data.

14. A method as defined in claim 12, further comprising reading the recorded digital signature from the memory in periods when the memory address area is otherwise unused.

15. A method as defined in claim 11, wherein calculating a current digital signature comprises calculating the current digital signature based on the data read from memory and the corresponding address of the data.

16. A circuit for detecting a fraud attempt on a digital processor including a processing unit and a memory, comprising:
   a calculation block to calculate a current digital signature of data read from an address area of the memory, wherein the calculation block is configured to calculate the current digital signature based on the data read from the memory and the corresponding address used to access the read data in the memory, the calculation block receiving, for calculating the current digital signature, the address used for addressing the read data in the memory;
   a comparison block to check coherence between the current digital signature and a recorded digital signature;
   a decision block to generate an indication of a fraud attempt based on a result of the comparison, wherein checking coherence between the current digital signature and the recorded digital signature, both based on the read data and the address used to access the read data, enables detection of a disturbance to an address decoder associated with the memory;
   a first storage element to store the data read from the memory;
   a second storage element to store corresponding addresses of the data read from the memory;
   a third storage element to store the recorded digital signature of the data;
   a fourth storage element to store the current digital signature of the data; and
   a fifth storage element to store an address of the recorded digital signature.

17. A circuit as defined in claim 16, wherein the recorded digital signature is stored in the memory.

18. A circuit as defined in claim 16, further comprising a controller configured to read the recorded digital signature from the memory in periods when the memory address area is otherwise unused.

* * * * *